(12) United States Patent
Davis et al.

(10) Patent No.: US 8,370,902 B2
(45) Date of Patent: Feb. 5, 2013

(54) RESCUING TRUSTED NODES FROM FILTERING OF UNTRUSTED NETWORK ENTITIES

(75) Inventors: Malcolm H Davis, Kirkland, WA (US); Aravind K Ramachandran, Redmond, WA (US); Geoffrey J Hulten, Lynnwood, WA (US); Ivan Osipkov, Bellevue, WA (US); Milenko Drinic, Bellevue, WA (US); Eliot C. Gillum, Mountain View, CA (US); Krishna C. Vitaldevara, Fremont, CA (US); Jason D. Walter, San Jose, CA (US); Mehrdad Bidgoli, San Francisco, CA (US); Robert L. McCann, Fall City, WA (US)

(73) Assignee: Microsoft Corporation, Redmond, WA (US)

(*) Notice: Subject to any disclaimer, the term of this patent is extended or adjusted under 35 U.S.C. 154(b) by 340 days.

(21) Appl. No.: 12/697,179

(22) Filed: Jan. 29, 2010

(65) Prior Publication Data

US 2011/0191832 A1 Aug. 4, 2011

(51) Int. Cl.
H04L 29/06 (2006.01)

(52) U.S. Cl. ............... 726/3; 726/2; 713/188; 709/223; 709/224; 709/225

(58) Field of Classification Search .................. None
See application file for complete search history.

(56) References Cited

U.S. PATENT DOCUMENTS

| | | | |
|---|---|---|---|
| 6,748,434 B2* | 6/2004 | Kavanagh | 709/224 |
| 6,944,775 B2* | 9/2005 | Barton et al. | 713/188 |
| 7,206,814 B2 | 4/2007 | Kirsch | |
| 7,219,148 B2 | 5/2007 | Rounthwaite et al. | |
| 7,475,118 B2 | 1/2009 | Leiba et al. | |
| 7,487,217 B2 | 2/2009 | Buckingham et al. | |
| 7,606,214 B1 | 10/2009 | Chandra Sekhar et al. | |
| 7,610,342 B1 | 10/2009 | Pettigrew et al. | |
| 7,610,344 B2 | 10/2009 | Mehr et al. | |
| 2002/0147780 A1* | 10/2002 | Liu et al. | 709/206 |
| 2003/0167321 A1* | 9/2003 | White | 709/223 |
| 2005/0171954 A1 | 8/2005 | Hull et al. | |
| 2006/0031483 A1* | 2/2006 | Lund et al. | 709/224 |
| 2006/0095586 A1 | 5/2006 | Adelman et al. | |

(Continued)

OTHER PUBLICATIONS

Zhao et al., "BotGraph: Large Scale Spamming Botnet Detection"—Published Date: Apr. 2009 http://www.usenix.org/events/nsdi09/tech/full_papers/zhao/zhao_html/.

"Reputation-Based Mail Flow Control"—Published Date: Oct. 15, 2007 http://www.ironport.com/pdf/ironport_reputation_based_control_whitepaper.pdf.

(Continued)

*Primary Examiner* — Ponnoreay Pich
(74) *Attorney, Agent, or Firm* — Microsoft Corporation

(57) ABSTRACT

Network entities controlling a set of nodes may vary by trustworthiness, such as tolerance for nodes that send spam, distribute malware, or perform denial-of-service attacks. A device receiving such activities may identify a trust rating of the network entity and apply appropriately stringent filtering (such as spam evaluation) to activities received from nodes controlled by the network entity. However, a poor trust rating of a network entity may subject a legitimate node controlled by the network entity to inefficiently or unfairly stringent activity filtering. Instead, the device may evaluate the activities of a particular node, assign a trust rating to the node, and if the trust rating of the node is higher than the trust rating of the network entity, apply less stringent activity filtering to the activities of the node, thereby "rescuing" the node from the more stringent activity filtering applied to the other nodes of the network entity.

20 Claims, 8 Drawing Sheets

U.S. PATENT DOCUMENTS

| | | | |
|---|---|---|---|
| 2006/0168041 | A1 | 7/2006 | Mishra et al. |
| 2008/0126344 | A1 | 5/2008 | Hoffman et al. |
| 2008/0133672 | A1 | 6/2008 | Gillum |
| 2008/0320119 | A1 | 12/2008 | Achan et al. |
| 2009/0013054 | A1 | 1/2009 | Libbey et al. |
| 2009/0265786 | A1 | 10/2009 | Xie et al. |
| 2009/0282476 | A1* | 11/2009 | Nachenberg et al. ........... 726/22 |
| 2009/0327430 | A1 | 12/2009 | Colvin et al. |
| 2011/0191847 | A1 | 8/2011 | Davis |

OTHER PUBLICATIONS

Gros et al., "Reputation based Protection of ISPs"—Retrieved Date: Jan. 28, 2010 http://www.zemris.fer.hr/~sgros/publications/wip/reputation.pdf.

Drinic, Milenko; "Applied Research Data Intelligence Platform.", Windows Live Safety Applied Research Note., http://team/sites/safety/appliedresearch/Shared%20Documents/ARDIPlatform.docx Published Date: Apr. 11, 2008, pp. 1-22.

Hao: et al., "Detecting Spammers with SNARE: Spatio-Temporal Network-Level Automatic Reputation Engine", http://www.usenix.org/events/sec09/tech/full_papers/hao.pdf Published Date: Aug. 2009, pp. 1-17.

Osipkov, et al.; "DNS Servers and the Criminal Spam Infrastructure.", Windows Live Safety Applied Research Report. http://team/sites/safety/appliedresearch/shared%20documents/DNS%20servers%20and%20the%20criminal%20spam%20infrastructure%20(part%210).docx Published Date: Dec. 2008-Jan. 2009; pp. 1-19.

"McAfee Anti-Spam: Protecting Your Organization from Spam, Phishing and Other Unsolicited Messages" http://www.mcafee.com Published Date: Oct. 2006, pp. 1-8.

"Precise Mail Overview—The Email Threat." Process Software—Precise Mail Overview. Http://www.process.com/precisemail/Technical%20Overview.pdf. Published Date: Nov. 13, 2006 pp. 1-28.

"Reputation-Based Mail Flow Control", Ironport Systems, Inc., http://www.ironport.com/pdf/ironport_reputation_based_control_whitepaper.pdf Published Date: Apr. 23, 2006 pp. 1-5.

Taylor, Bradley, "Sender Reputation in a Large Webmail Service.", http://www.ceas.cc/2006/19.pdf Published Date: Aug. 13, 2006 pp. 1-6.

"Sendmail IP Reputation Service", Sendmail, Inc. http://www.sendmail.com/pdfs/resources/WhitePapers/ds_5.07_ip_reputation.pdf Published Date: Oct. 17, 2007 pp. 1-4.

Drinic, Milenko; "URL IP Spam Filtering" Windows Live Safety Applied Research Report. http://team/sites/safety/appliedresearch/Shared%2020Documents/URLIPSpamFiltering_Report.docx Published Date: Oct. 2007 pp. 1-13.

Drinic, Milenko; "URLs in Spam Emails", Windows Live Safety Applied Research Note. http://team/sites/safety/appliedresearch/Shared%20Documents/URLs%20in%20Spam%20Emails_Early_2007_Data.docx. Published Date: Jul. 25, 2007 pp. 1-12.

Non Final Office Action cited in related U.S. Appl. No. 12/697,170 Date: Aug. 15, 2012 pp. 1-33.

* cited by examiner

RESCUING TRUSTED NODES FROM FILTERING OF UNTRUSTED NETWORK ENTITIES

BACKGROUND

Many computing scenarios involve a network connecting a device with one or more nodes of the network, and that particularly involve the filtering of activity of the nodes while interacting with the device. For example, an email server may receive email from many nodes, but may filter out bulk unsolicited email messages ("spam") from desired email messages; a webserver may be configured to differentiate legitimate web requests from unproductive web requests, such as disingenuous requests submitted as a denial-of-service attack; and a file server may wish to provide service while identifying and blocking intrusion attempts (e.g., attempts to install malware in order to commandeer the server for a "botnet" controlled by another individual.)

In each of these scenarios, it may be desirable to implement filtering techniques on the device that successfully identify and exclude unwanted activity and that reduce the frequency of accidentally excluding wanted activity (e.g., a "false positive" in a filtering scheme), while efficiently utilizing the resources of the device (e.g., memory, network capacity, and processor usage) in performing the filtering. In the particular scenario of bulk unsolicited email messages, filtering techniques often involve various properties of the email messages, such as blacklists of notorious or suspected spammers, whitelists of senders that are believed to be acceptable to recipients of such email messages, and keywords that are often included in spam email messages (such as the names of popular pharmaceuticals that are often advertised for sale via spam email messages.) Increasing the aggressiveness of these filtering techniques may successfully reduce the delivery of spam email messages, but may also raise the number of "false positives" of non-spam email messages that are incorrectly identified as spam by the filtering techniques and withheld from delivery to users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One filtering technique that may present particular advantages involves the assignment of a network entity trust rating to a network entity, such as an automated system (AS) identified by an automated system number (ASN), where the network entity trust rating is correlated with the desirability or undesirability of activities presented to the device by various nodes controlled by the network entity. For example, a first network entity may control well-secured nodes and may send predominantly significant activities to the device, while a second network entity may be tolerant of some undesirable activities of various nodes (e.g., the second network entity may host one or more nodes that send bulk unsolicited email messages to the device), and a third network entity may host several nodes that coordinate to send significantly undesirable activities to the device (e.g., a botnet comprising many nodes that perform a coordinated attempt to commandeer the device by injecting malware or a denial-of-service attack on the device.) Therefore, by evaluating the activities of the nodes, the device may assign to the network entity a network entity trust rating, and may apply a correspondingly strong degree of activity filtering to various nodes controlled by the network entity. If the network entity trust rating is particularly low, comparatively heavy and aggressive activity filtering techniques may be utilized; such techniques may result in greater success of filtering out undesirable activities, but at the cost of increasing the rate of false positives (e.g., desirable activities that are incorrectly identified as undesirable activities) and/or of increased utilization of computing resources (e.g., network bandwidth and processor and memory usage.)

However, in some scenarios, one or more nodes controlled by a network entity may exhibit a significantly higher degree of desirable activities than other nodes controlled by the same network entity. For example, a network entity may include several nodes comprising a botnet that send significant amounts of undesirable activities to the device, but may also include nodes that generate predominantly legitimate and desirable activities to the device. Therefore, while the network entity may be assigned a poor network entity trust rating that may result in heavy filtering of the activities of the nodes controlled by the network entity (e.g., the application of particularly aggressive spam filtering of email messages), it may be unfair or inefficient to apply similarly heavy activity filtering to nodes controlled by the network entity but having a higher node trust rating.

In view of these considerations, techniques may be devised to "rescue" nodes with a high node trust rating from the heavy filtering caused by a poor trust rating of a network entity controlling the nodes. According to these techniques, when a node trust rating is assigned to a node (based on an evaluation of the activities generated by the node while interacting with the device), the node trust rating may be compared with a network entity trust rating assigned to the network entity controlling the node. If the node trust rating is higher than the network entity trust rating, the device may filter the activities of the node based on the node trust rating (e.g., by using comparatively lighter and less stringent filtering corresponding to the higher trust rating.) If not, the device may filter the activities of the node based on the network entity trust rating (e.g., by using comparatively heavier and more stringent filtering corresponding to a poor network entity trust rating.) In this manner, the filtering of the activities of the node may more accurately reflect the trust rating of the node, thereby improving communication of the device with trusted nodes, reducing the incidence of false positives of incorrectly excluded activities, and economizing potentially resource-intensive filtering of activities that are predominantly legitimate.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
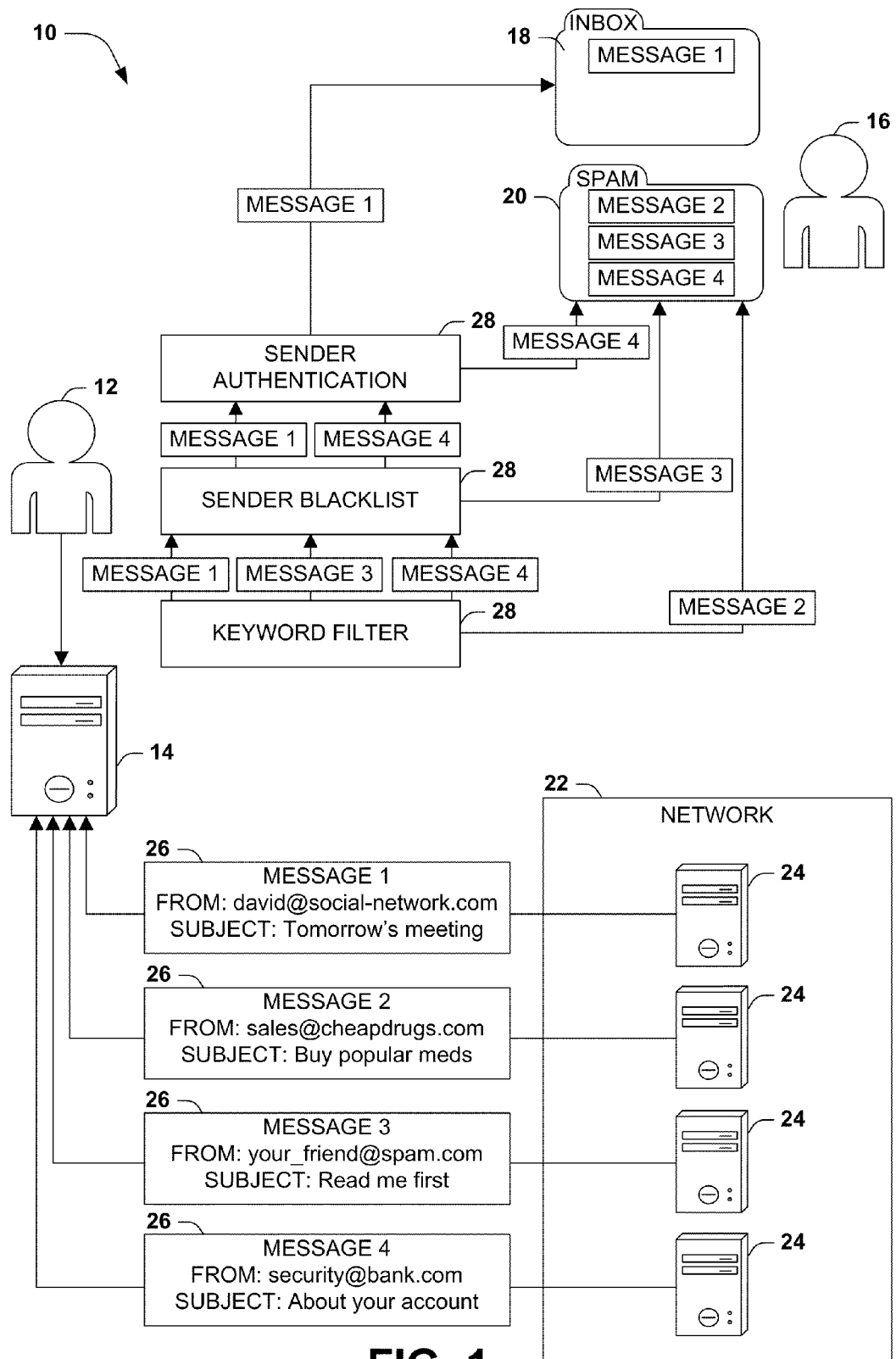
FIG. 1 is an illustration of an exemplary scenario featuring activities comprising email messages sent by nodes interacting over a network with a device comprising an email server and a filtering of such activities by the device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve the communication of a device (such as a server, a router, a firewall, a workstation, a notebook, a smartphone, or a network appliance) with various nodes (each node comprising another device) over a wired or wireless network. However, along with the proliferation of advantageous uses of network communication, many uses of network communication have been developed that are undesirable to an owner of the device. As a first example, the device may comprise an email server configured to receive email messages from various nodes and addressed to users of the device. However, some of the nodes may send bulk unsolicited email messages ("spam") to the device, and the device may filter the received email messages to reduce the delivery of spam to users. As a second example, the device may comprise a webserver configured to receive and fulfill web requests received from users of other nodes, but some such requests may be disingenuous and intended to consume the resources of the webserver (e.g., a denial-of-service attack.) The webserver may be configured to identify and fulfill genuine requests in order to provide productive web service, while disregarding disingenuous requests. As a third example, the device may be exposed via the network to some nodes that attempt to deliver malware (e.g., "trojan" software that surreptitiously commandeers a portion of the computing resources of the device on behalf of another individual, such as by joining a "botnet" comprising a network of commandeered devices under the control of the other individual.) The device may utilize various techniques to reduce contact from potentially malicious nodes, such as a stateless or stateful firewall that excludes types of contact that are likely to be illegitimate.

In these and other scenarios, an operator of the device may endeavor to configure the device to utilize various forms of filtering of activity of various nodes of the network that attempt to interact with the device. The operator may seek to employ one or more filtering techniques that achieve a high accuracy of excluding undesirable activity while reducing the mis-identification and exclusion of desirable activity ("false positives"), and while conserving computing resources (e.g., network bandwidth, memory and processor usage, and processing delays in evaluating the activity.) Thus, while more aggressive filtering may result in the exclusion of a higher percentage of undesirable activity (such as the rerouting of spam email messages to a "spam" email folder instead of to users' inbox folders), the consequences of false positives (e.g., non-spam messages incorrectly routed to the "spam" email folder) and/or the consumption of computing resources may be too costly. Therefore, efficient and accurate filtering techniques are desirable in configuring devices to filter the activity of nodes interacting with the device.

In particular, email servers are often configured to reduce the delivery of "spam" to users by utilizing a combination of filtering techniques. Content-based filters may be utilized to examine email messages received from various nodes for indicators of bulk unsolicited email; e.g., spam email messages may be highly correlated with particular keywords, such as the names of popular pharmaceuticals that are often offered for sale via spam email messages. Sender-based filters may also be utilized to identify senders of email messages that are known to send large amounts of spam. For example, some "phishing" spammers endeavor to send email that appears to originate from various trusted senders, such as banks, auction sites, and software sites, and that include a hyperlink that leads to a false representation of the website of the sender that captures valuable data provided by the user (e.g., account identifiers and passwords) and delivers such data to another individual. In order to detect and reduce "phishing" email messages, a webserver may be configured to identify email messages that appear to originate from such trusted websites, and to contact the trusted website to verify the contents of the email message before delivering the email message to the recipient(s). By using a combination of these and other techniques, an email server may be configured to filter the activities of various nodes that send email messages to the email server, thereby differentiating legitimate email messages from various types of spam. Email messages that are identified with a high degree of probability of comprising spam may be processed through various other techniques, such as dropping the email message, bouncing the email message back to the sender, notifying the user that the email message may be spam, delivering the email message to a "spam" email folder instead of the inbox email folder of the user, delaying the receipt of the email message from the node (thereby imposing a penalty on the node that reduces the rate of delivering spam email messages in bulk, while not significantly affecting the delivery of legitimate email messages), and "time travel" (upon identifying an email message as spam, identifying similar email messages within the inboxes of other users that have not yet been delivered to the users, and removing such email messages before delivery.)

FIG. 1 presents an exemplary scenario 10 featuring a device 14 configured to utilize various filtering techniques 28 to evaluate some activities initiated with the device 14 by various nodes 24 of a network 22. In this exemplary scenario 14, the device 14 comprises an email server that is configured by a user 12 (such as a network administrator) to receive email messages 26 addressed to a client 16, and to deliver such email messages 26 to the client 16 in various folders. Furthermore, the device 14 is configured to utilize various filtering techniques 28 to differentiate spam email messages from non-spam email messages, to deliver non-spam email messages 26 to the client 16 through an inbox folder 18, and to deliver spam email messages 26 to the client 16 through a spam folder 20. In this manner, the client 16 may receive and review the non-spam email messages 26, and may also receive the spam email messages 26 in a separate location that may be reviewed by the client 16, e.g., in order to retrieve false positives (non-spam email messages 26 that have been incorrectly identified as spam email messages 26.)

In the exemplary scenario 10 of FIG. 1, the device 14 receives four email messages 26 from four different nodes 24 of the network 22, and endeavors to filter these activities of the nodes 24 to identify and remove spam email messages 26. The device 14 may evaluate all four email messages 26 with a first filtering technique 28 comprising a keyword filter that identifies keywords that are highly correlated with spam email messages 26 (e.g., the term "popular meds" in the second email message 26), and that routes email messages 26 containing such keywords to the spam folder 20 of the email account of the client 18. The device 14 may next evaluate the remaining three email messages 26 with a second filtering technique 28 comprising a sender blacklist, which identifies a list of senders that are known to send high volumes of spam email messages 26 (e.g., "your_friend@spam.com", the sender of the third email message 26), and that routes email messages 26 sent from such senders to the spam folder 20 of the email account of the user 18. The device 14 may next evaluate the remaining two email messages 26 with a third filtering technique 28 comprising sender authentication 28, which identifies often-impersonated senders (e.g., "security@bank.com", the sender of the fourth email message) which contacts the senders in order to authenticate such email messages 26, and which routes unverified email messages 26 impersonating these senders to the spam folder 20 of the email account. As a result of these filtering techniques 28, the device 14 presents to the client 16 an inbox folder 18 containing the single genuine email message 26, and a spam folder 20 containing the email messages 26 that have been identified as spam.

In this and other scenarios, a device 14 may utilize activity filtering techniques to improve communications with nodes 24 interacting with the device 14 of the network 22. One such technique relates to a network hierarchy aspect, wherein one or more nodes 24 are controlled by a network entity, such as a recognized operator of a set of components operating on the network 22. The operator may comprise an individual, a group of individuals, an organization, a corporation, a government, etc., and may be represented in various ways (e.g., as an autonomous system (AS), which may be identified in by a particular autonomous system number (ASN) according to an autonomous systems registry, such as the Autonomous System Number Registry managed and provided by the Internet Assigned Numbers Authority (IANA).) A particular network entity may manage the nodes 24 under its control in a particular manner; e.g., a first network entity may exercise tight control over the nodes 24 to be utilized only for desirable activities 34, while a second network entity may exercise lax control over the nodes 24 and may be tolerant of some undesirable activities 34 (such as a node configured to send bulk unsolicited email messages to various recipients, such as the device 14), and a third network entity may configure various nodes 24 to perform significantly undesirable activities 34, such as performing a denial-of-service attack on the device 14. Accordingly, some activity filtering techniques may involve the assignment of a network entity trust rating to a network entity based on an evaluation of the activities 34 performed by nodes 24 under the control of the network entity. A network entity that controls nodes 24 that send predominantly desirable activities 34 to the device 14 may be assigned a high network entity trust rating, while a network entity that controls nodes 24 that send significant amounts of undesirable activities 34 (e.g., sending a high volume of spam email messages to the device 14) may be assigned a poor network entity trust rating. Having assigned a suitable network entity trust rating to a network entity, the device 14 may then filter the activities 34 received from nodes 24 controlled by the network entity based on the network entity trust rating. This activity filtering technique may therefore "roll up" or aggregate evaluations of activities 34 to infer a reputation of the network entity, and may use this reputation as a predictive indicator of the desirability of subsequent activities 34 received from nodes 24 controlled by the network entity.

Figure 2:
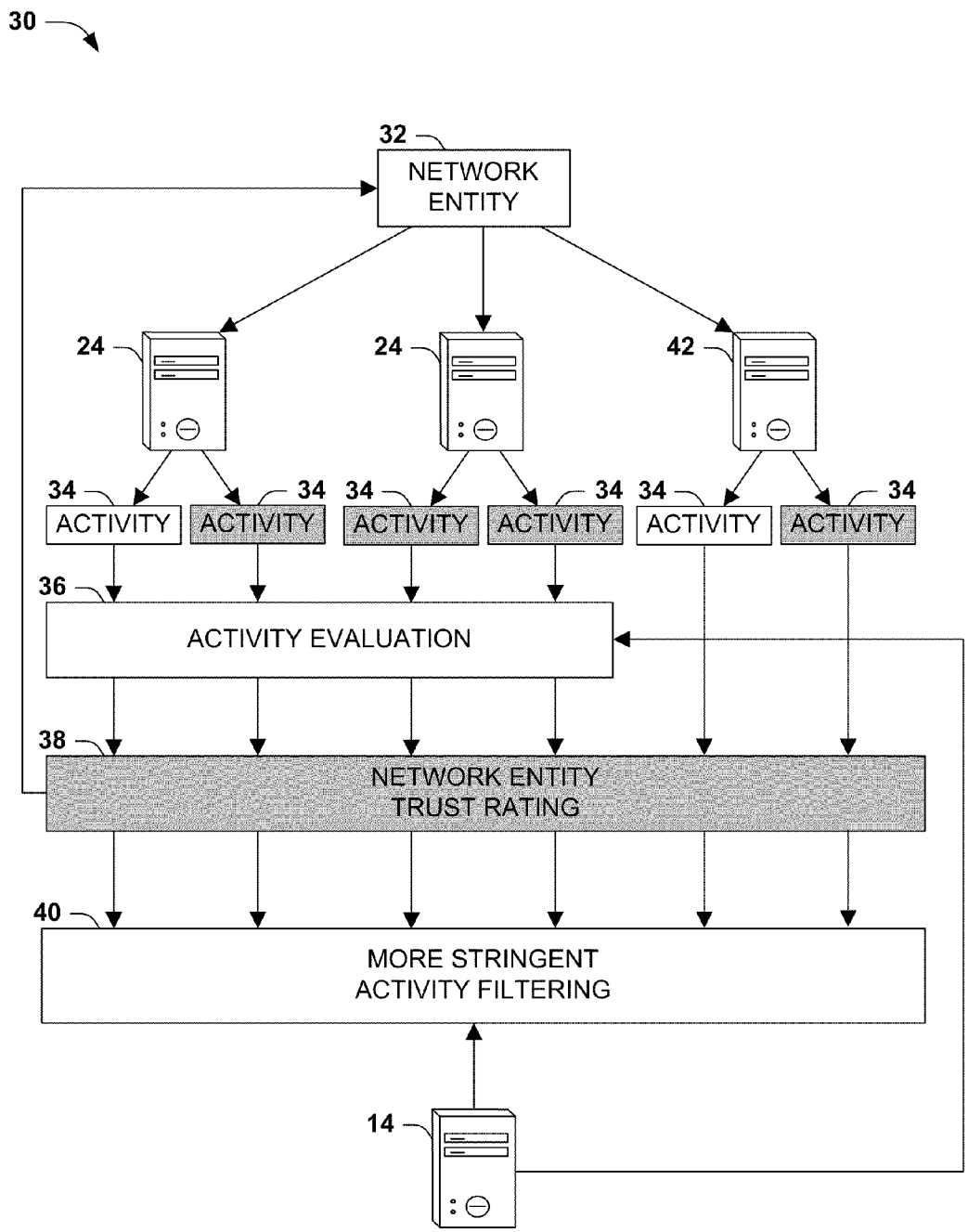
FIG. 2 is an illustration of an exemplary scenario featuring a filtering of activities sent to a device over a network by nodes controlled by a network entity.

FIG. 2 presents an exemplary scenario 30 featuring a network entity 32 that controls three nodes 24, each of which sends various activities 34 over a network 22 to a device 14 (e.g., sending email messages, text messages, files, web requests, database queries, or invocations of services offered by the device 14.) These activities 34 may comprise undesirable activities (as indicated in this exemplary scenario 30 by dark shading) or desirable activities (as indicated in this exemplary scenario 30 by a lack of shading.) In order to improve communications with the nodes 24 over the network 22, the device 14 may endeavor to filter the activities 34 based on the desirability thereof. The device 14 may perform an activity evaluation 36 of respective activities 34 received from respective nodes 24 (e.g., by applying one or more spam identification techniques in order to differentiate spam email messages from non-spam email messages.) For example, the device 14 may find that, of the activities sent by a first node 24 controlled by the network entity 32 to the device 14, approximately 50% are desirable and approximately 50% are undesirable, and that a second node 24 controlled by the network entity 32 often sends approximately 100% of undesirable activities 34 to the device 14. Based on these evaluations of the activities 34 of the nodes 24, the device 14 may assign to the network entity 32 a network entity trust rating 38, and may then apply filtering to the activities 34 of the nodes 24 based on the network entity trust rating 38 assigned to the network entity 32. In this exemplary scenario 30, the device 14 may assign a poor network entity trust rating 38 to the network entity 32, reflecting the high proportion of undesirable activities 34 received from the nodes 24, and may therefore apply more stringent activity filtering 40 to the activities 34 of the nodes 24. This filtering may be advantageous, e.g., for filtering the activities 34 received from a new node 42 controlled by the network entity 32 (e.g., a new device added to the network under the control of the network entity 32.) The network entity trust rating 38 may be predictive of the types of activities 34 that may be received from the new node 42, and more stringent activity filtering 40 may be applied to the new node 42 even before any activities 34 of the new node 42 have been subjected to an activity evaluation 36.

While the exemplary scenario 30 of FIG. 2 illustrates some advantages of this filtering technique, some disadvantages may arise that result in an inaccurate filtering of activities 34 of a particular node 24. While the poor network entity trust rating 38 assigned to the network entity 32 may be predictive of the desirability of activities 34 that are likely to be received from a new node 42, this prediction may not be accurate. For example, the network entity 32 may comprise a network host that is comparatively tolerant of nodes 24 sending bulk unsolicited email messages to the device 14, and may therefore host nodes 24 engaging in such activities 34, but may also host a new node 42 comprising a legitimate user who initiates predominantly desirable activities 34 with the device 14. However, if the device 14 applies more stringent activity filtering 40 to all nodes 24 (including the new node 42 of the network entity 32 based on the poor network entity rating 38, this filtering may present an unfair penalty to the new node 42 that is not sending undesirable activities 34 to the device 14. For example, this more stringent activity filtering 40 may be inefficient (e.g., by applying resource-intensive spam evaluation techniques to scrutinize closely all email messages received from the new node 42, even if the new node 42 demonstrates a consistent pattern of sending only non-spam email messages) and/or unfair (e.g., the bandwidth of a network connection of the device 14 to the new node 42 may be throttled in anticipation of receiving undesirable activities 34, even if no such undesirable activities 34 are ever sent by the new node 42.) Moreover, in some scenarios, this inaccurate filtering may be irredeemable. For example, for network entities 32 featuring a particularly poor network entity trust rating 38 (e.g., a network entity 32 operating nodes 24 as a botnet in order to conduct a denial-of-service attack on the device 14), the device 14 may completely block network connections that any nodes 24 controlled by the network entity 32 (including the new node 42) may attempt to initiate with the device 14, and the new node 42 may therefore be unable to establish a pattern of sending predominantly desirable activities 34 to the device 14.

Figure 3:
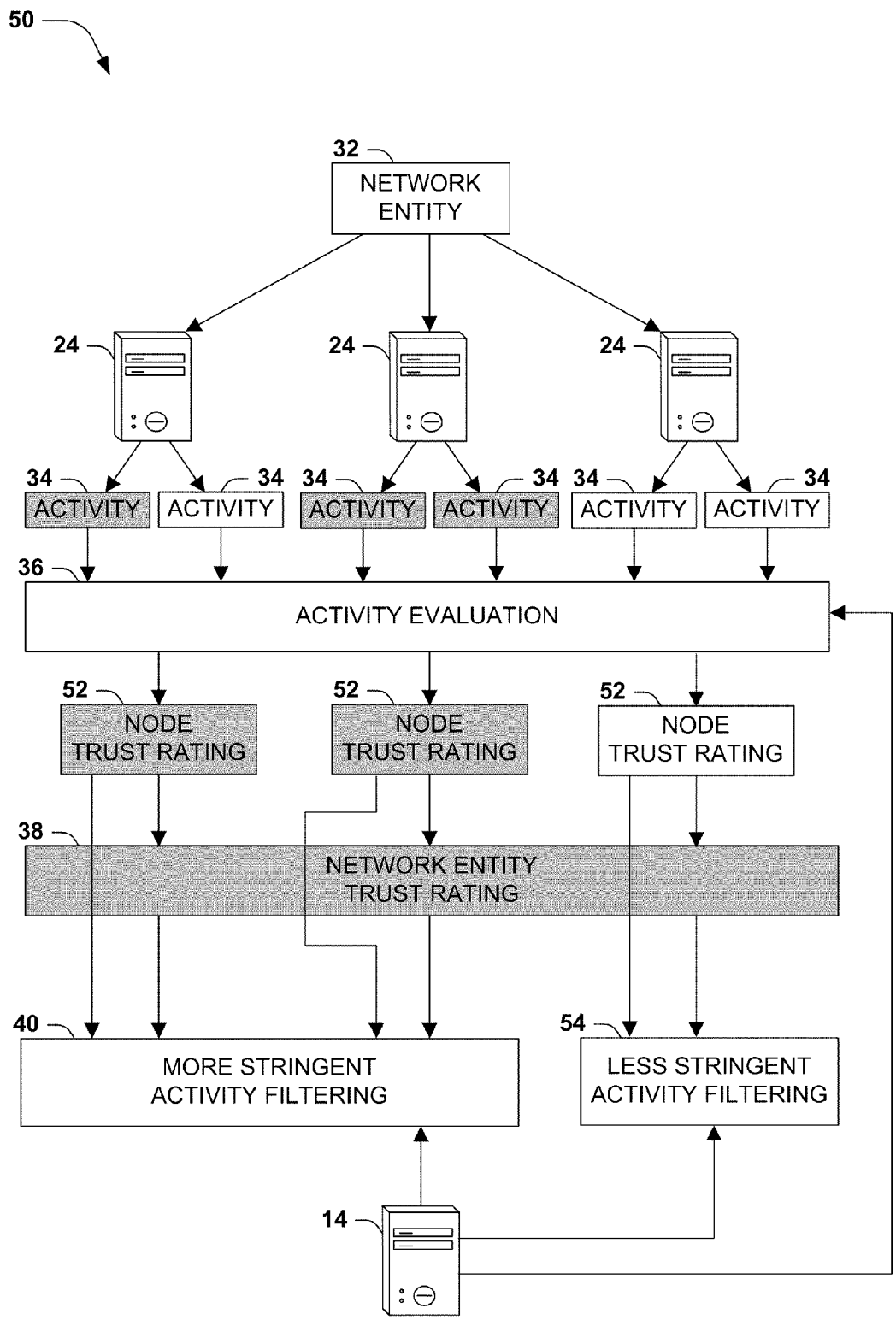
FIG. 3 is an illustration of an exemplary scenario featuring a filtering of activities sent to a device over a network by nodes controlled by a network entity according to the techniques presented herein.

In view of these problems, techniques may be developed to filter the activities 34 of nodes 24 controlled by a network entity 32 that permit a more accurate assignment of trust ratings and more accurate activity filtering applied to the nodes 24. FIG. 3 presents an exemplary scenario 50 featuring a filtering of activities 34 sent to the device 14 by various nodes 24 controlled by a network entity 32. The activities 34 of respective nodes 24 may again be subjected to the activity evaluation 36 (such as one or more spam identification techniques applied to email messages sent to the device 14 by the nodes 24) in order to evaluate the desirability of such activities 34. However, in this exemplary scenario 50, the device 14 may assign to each node 24 a node trust rating 52 reflecting the desirability of activities 34 sent by the node 24 to the device 14. For example, a poor node trust rating 52 may be assigned to the first node 24 and the second node 24 which, among all activities 34 sent by the node 24 to the device 14, send approximately 50% and 100%, respectively, of undesirable activities 34. By contrast, a third node 52 may be identified as sending to the device 14 predominantly desirable activities 34 (such as non-spam email messages and/or legitimate web requests), and the device 14 may assign to the third node 24 a comparatively high node trust rating 42. The device 14 may then utilize the node trust ratings 52 assigned to respective nodes 24 controlled by the network entity 32 in order to identify a network entity trust rating 38. In this exemplary scenario 50, in view of the poor node trust ratings 52 assigned to the first node 24 and the second node 24 and the high node trust rating 52 assigned to the third node 24, the device 14 may assign to the network entity 32 a poor network entity trust rating 38.

After assigning the node trust ratings 52 to respective nodes 24 and the network entity trust rating 38 to the network entity 32, the device may select an appropriate type and/or degree of activity filtering to apply to activities 34 received from nodes 24 controlled by the network entity 32. For example, the device 14 may apply more stringent activity filtering 40 to the nodes 24 controlled by the network entity 32, including the first node 24 and the second node 24 that also have poor node trust ratings 52. However, it may be inefficient and/or unfair to apply more stringent activity filtering 40 to the third node 24, which sends to the device 14 predominantly desirable activities 34. Therefore, in selecting a type and/or degree of activity filtering to apply to a node 24, the device 14 may consider both the network entity trust rating 38 of the network entity 32 controlling the node 24 and also the node trust rating 52 of the node 24. Because the node trust ratings 52 of the first node 24 and the second node 24 are not higher than the network entity trust rating 38, the device 14 may filter the activities of these nodes 24 based on the network entity trust rating 38, thereby applying more stringent activity filtering 40 to activities 34 received from these nodes 24. However, the device 14 may determine that the third node 24 is assigned a higher node trust rating 52 than the network entity trust rating 38 of the network entity 32, and may therefore filter the third node 24 based on the node trust rating 52 (e.g., by applying less stringent activity filtering 52 to activities 34 received from the third node 24.) In this manner, while the device 14 ordinarily operates by selecting the activity filtering of any node 24 controlled by the network entity 32 based on the network entity trust rating 38, the device 14 creates an exception to this operation for the third node 24 in view of the higher node trust rating 52 of the third node 24, thereby "rescuing" the third node 24 from the heavy filtering applied to the untrusted network entity 32. The filtering techniques illustrated in this exemplary scenario 50 may thereby benefit the device 14 (e.g., by allocating more filtering resources to the activities 34 of less trusted nodes 24 and fewer filtering resources to the activities 34 of more trusted nodes 24) and/or the trusted third node 24 (e.g., by applying less stringent activity filtering 54 that may result in fewer false positives and more efficient communication between the device 14 and the node 24.)

Figure 4:
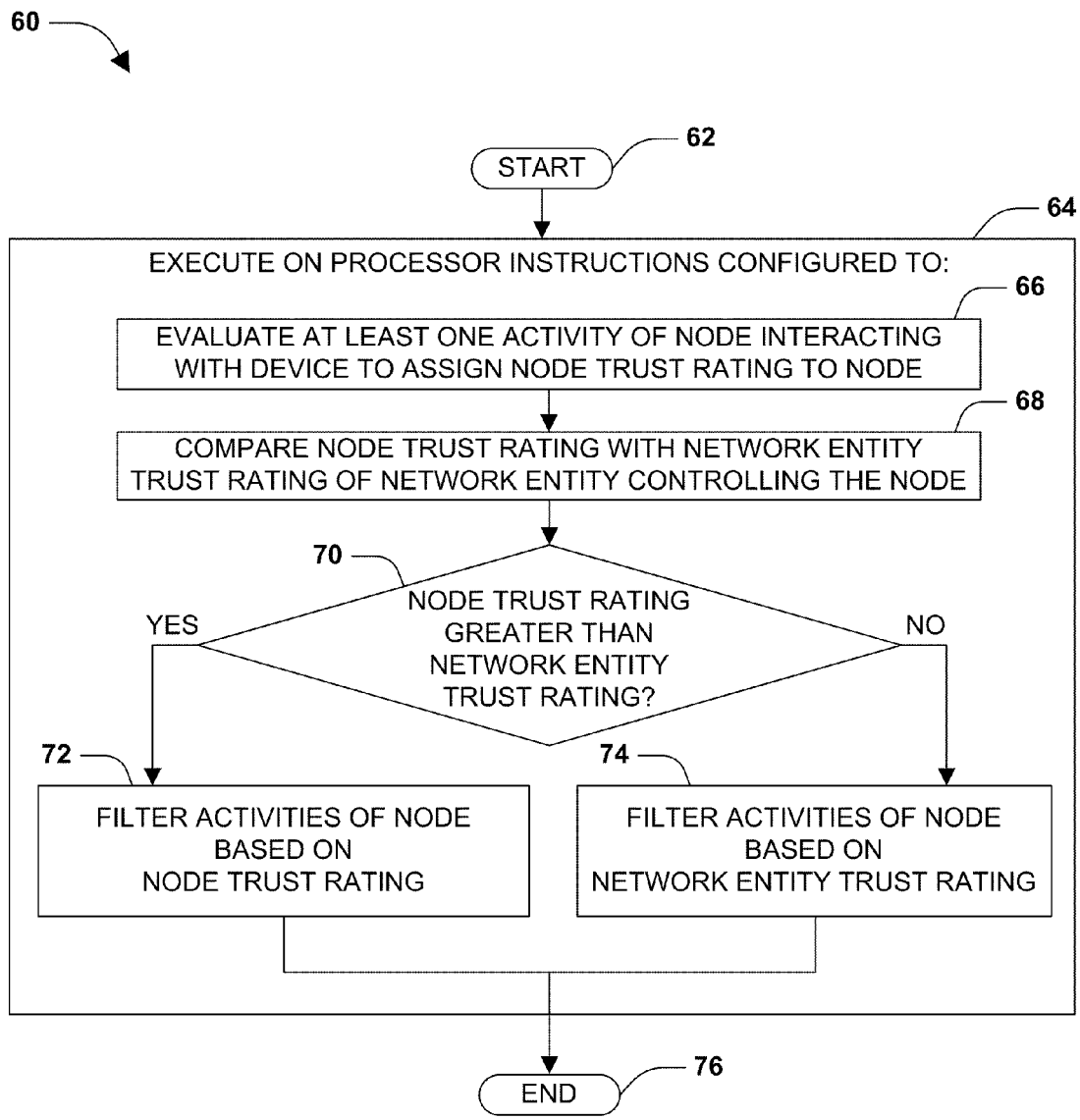
FIG. 4 is a flow chart illustrating an exemplary method of filtering activities of a node interacting over a network with a device.

FIG. 4 presents a first embodiment of these techniques, illustrated as an exemplary method 60 of filtering activities 34 of a node 24 interacting with a device 12 having a processor. The exemplary method 60 may be implemented, e.g., as a set of processor-executable software instructions stored in a volatile or nonvolatile memory of the device 14, such as a hard disk drive, a flash memory device, or an optical disc. The exemplary method 60 begins at 62 and involves executing 64 on the processor instructions configured to perform the techniques presented herein. In particular, the instructions may be configured to evaluate 66 at least one activity 34 of the node 24 interacting with the device 14 to assign a node trust rating 52 to the node 24. The instructions may also be configured to compare 68 the node trust rating 52 with a network entity trust rating 38 of a network entity 32 controlling the node 24. Based on the results of this comparing, if the node trust rating 52 of the node 24 is determined to be higher than the network entity trust rating 38 of the network entity 32, the instructions may be configured to filter 70 activities 34 of the node 24 based on the node trust rating 5; but if the node trust rating 52 of the node 24 is determined not to be higher than the network entity trust rating 38 of the network entity 32, the instructions may be configured to filter 72 activities 34 of the node 24 based on the network entity trust rating 38. In this manner, the exemplary method 60 achieves the filtering of the activities 34 of the node 34 based on the network entity trust rating 38 while also "rescuing" trusted nodes 34 from unfairly and/or inefficiently heavy activity filtering, and so ends at 76.

Figure 5:
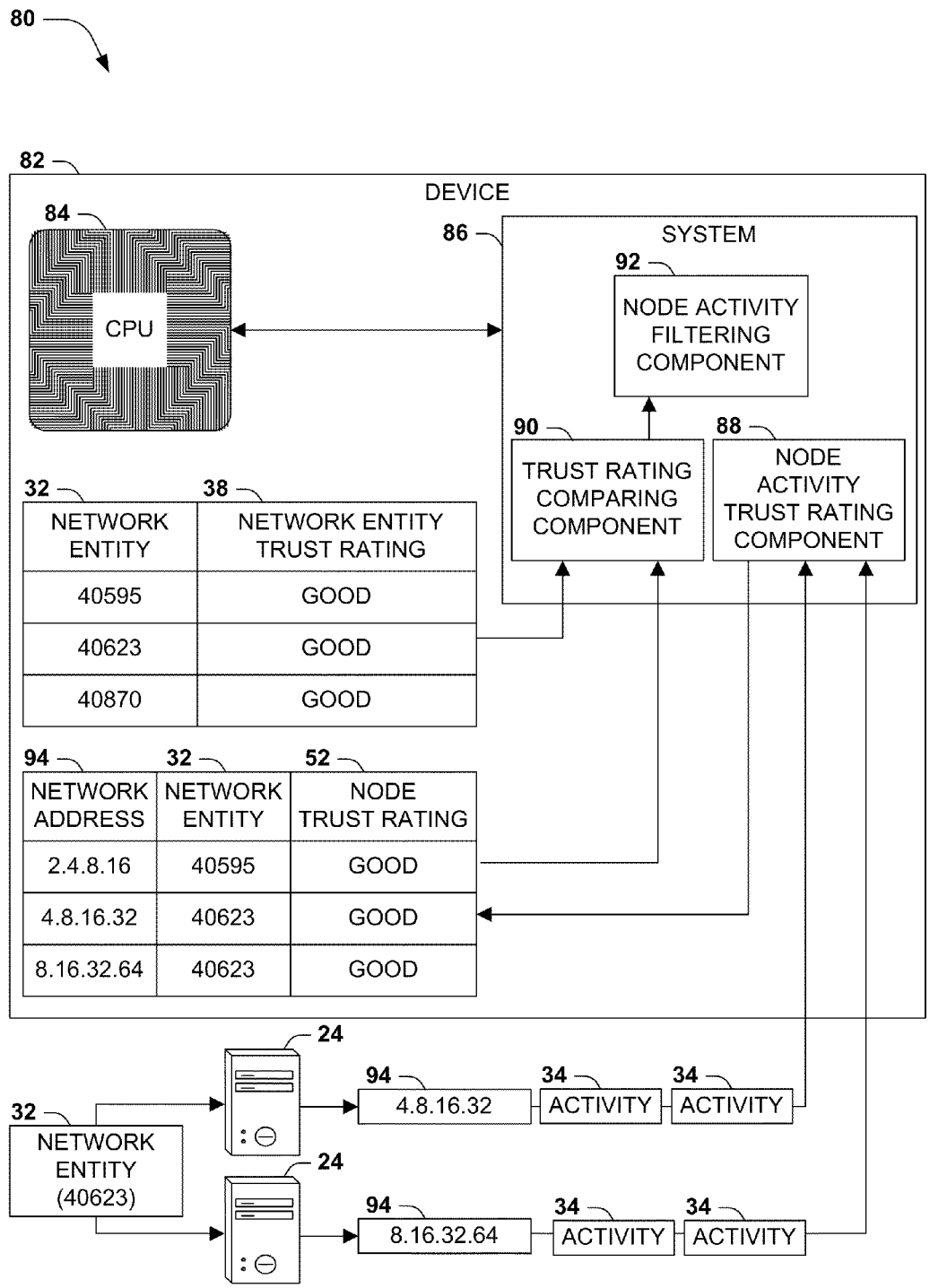
FIG. 5 is a component block diagram illustrating an exemplary system for filtering activities of a node interacting over a network with a device.

FIG. 5 presents a second embodiment of these techniques, illustrated as an exemplary system 86 operating within a device 82 having a processor 84, where the exemplary system 86 and configured to filter activities 34 of various nodes 24 interacting over a network 22 with the device 82 based on the techniques presented herein. The nodes 24 may be controlled by a particular network entity 32 (e.g., an autonomous system (AS) identified according to an autonomous system number (ASN)), and respective nodes 24 may be identified on the network 22 according to a network address 94. The exemplary system 86 may be implemented, e.g., as components of a software architecture stored in a volatile or nonvolatile memory of the device 82 and executed on the processor 84. The exemplary system 86 comprises a node activity trust rating component 88, which is configured to evaluate at least one activity 34 of a node 24 interacting with the device 82 to assign a node trust rating 52 to the node 24. The exemplary system 86 also comprises a trust rating comparing component 90, which is configured to compare the node trust rating 52 of the node 24 with a network entity trust rating 38 of the network entity 32 controlling the node 24. The exemplary system 86 also comprises a node activity filtering component 92, which is configured to filter activities 34 of the node based on the comparing performed by the trust rating comparing component 90. If the trust rating comparing component 90 identifies a higher node trust rating 52 of the node 24 than the network entity trust rating 38 of the network entity 32, the node activity filtering component 92 may filter the activities 34 of the node 23 based on the node trust rating 52. However, if the trust rating comparing component 90 fails to identify a higher node trust rating 52 of the node 24 than the network entity trust rating 38 of the network entity 32, the node activity filtering component 92 may filter activities 34 of the node 24 based on the network entity trust rating 38. In this manner, the components of the exemplary system 86 perform various aspects of the filtering techniques illustrated (e.g.) in the exemplary scenario 50 of FIG. 3, and thereby achieve the filtering of the activities 34 of the nodes 24 according to the techniques presented herein.

Figure 6:
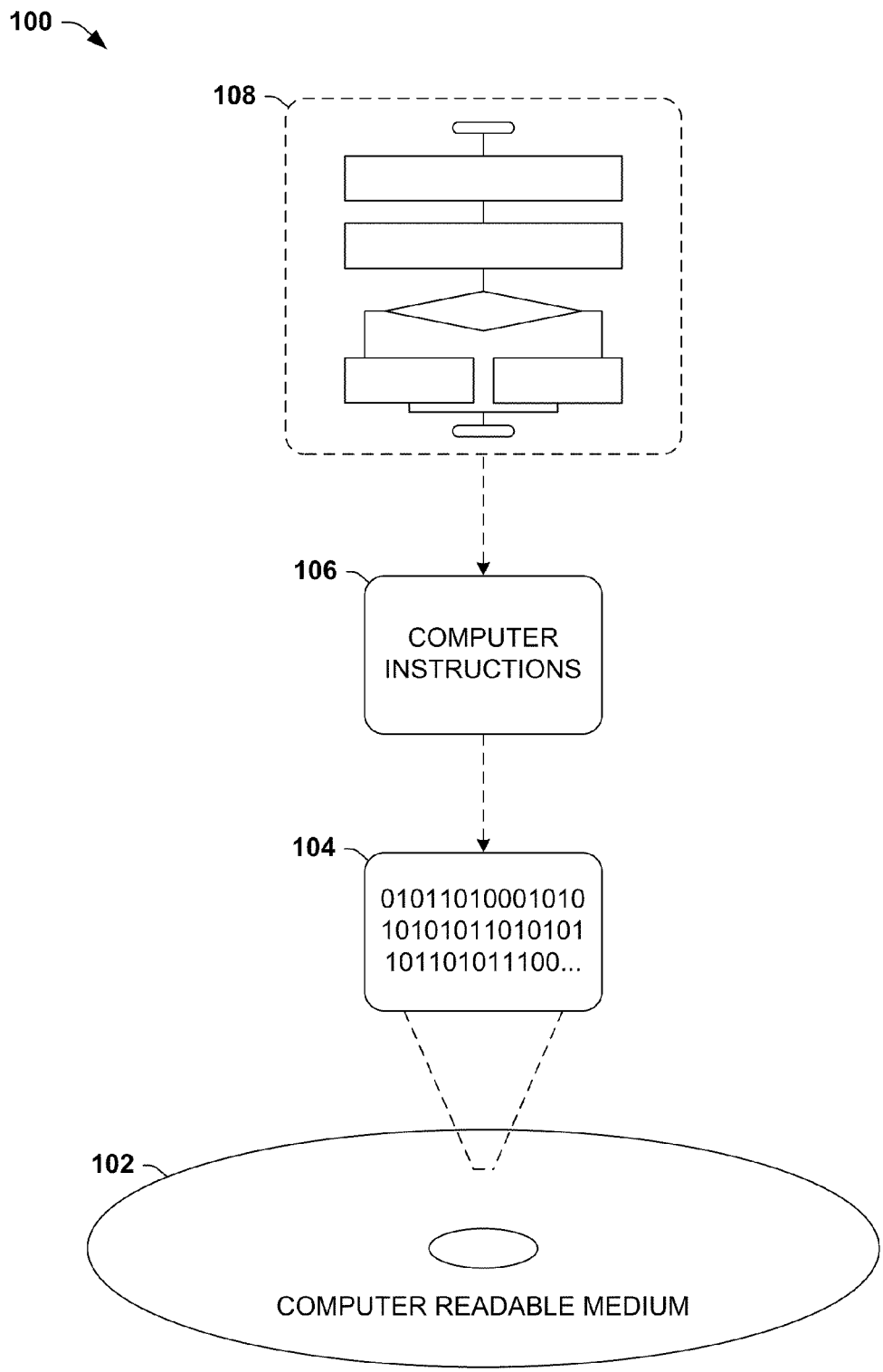
FIG. 6 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 6, wherein the implementation 100 comprises a computer-readable medium 102 (e.g., a CD-R, DVD-R, or a platter of a hard disk drive), on which is encoded computer-readable data 104. This computer-readable data 104 in turn comprises a set of computer instructions 106 configured to operate according to the principles set forth herein. In one such embodiment, the processor-executable instructions 106 may be configured to perform a method of filtering activities of a node interacting over a network with a device, such as the exemplary method 60 of FIG. 4. In another such embodiment, the processor-executable instructions 106 may be configured to implement a system for filtering activities of a node interacting over a network with a device, such as the exemplary system 86 of FIG. 5. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques presented herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 60 of FIG. 4 and the exemplary system 86 of FIG. 5) to confer individual and/or synergistic advantages upon such embodiments.

A first aspect that may vary among embodiments of these techniques relates to the scenarios wherein these techniques may be utilized. A first aspect that may vary among embodiments of these techniques relates to the scenarios wherein the techniques presented herein may be utilized. As a first example, the techniques may be used to filter many types of activities received by many types of devices, including email messages received by an email server; text messages received by a text messaging server, such as a chat server or a simple messaging service (SMS) server; social network messages received by a social network server; web request received by a webserver, such as weblog posts received by a weblog server; database queries received by a database server; and invocations of services received by various types of servers, such as accesses of files on a file server.

As a second example of this first aspect, the activities 34 may be received from many types of nodes 24 interacting with the device 14. As a first variation, a node 24 may comprise a device legitimately operated by a user 12, such as an individual, a group of individuals, an organization, a corporation, a government, or even a fully autonomous device that sends legitimate activities 34 to the device 14. As a second variation of this second example, a node 24 may be configured by a user 12 to distribute undesirable activities 34 to the device 14, such as a spam email server, a distributor of various forms of malware, or a phishing server that attempts to impersonate a trusted server in order to extract sensitive information from unsuspecting visitors. As a third variation of this second example, a node 24 may have been accidentally misconfigured by a user 12 in a manner that generates undesirable activities 34 (e.g., an email server that accidentally sends huge numbers of a particular email message to the device 14, or that has been misconfigured as an open relay that is exploited by a spam email server to redeliver large volumes of spam email messages.) As a fourth variation of this second example, a node 24 may be legitimately operated by a user 12 and may therefore generate some legitimate activities 34, but may have been commandeered by malware to generate undesirable activities 34 (e.g., a node 24 may send legitimate web requests to a device 14 comprising a webserver, but may also have been infected with malware that attempts to deliver large volumes of spam messages and/or perform denial-of-service attacks against the device 14 and/or other nodes 24 of the network 22.)

As a third example of this first aspect, the techniques may be implemented through many types of architectures. As a first variation of this third example, the architecture of the exemplary system 86 of FIG. 5 may vary in many different ways; e.g., a single component may both evaluate the activities 34 of the node 34 interacting with the device 14 to assign a node trust rating 52 to the node 24 and compare the assigned node trust rating 52 of the node 24 with a network entity trust rating 38 of a network entity 32 controlling the node 24. As a second variation of this third example, the device 82 may be configured to store locally the node trust ratings 52 and/or the network entity trust ratings 38. Alternatively, the device 82 may store and/or reference remotely stored trust ratings, such as a node trust rating 52 identified in a blacklist or whitelist database managed by a machine accessible to the device 14 over the network 22. As another alternative, the device 82 may not store the trust rating of a node 24 and/or a network entity 32, but may compute these trust ratings only ephemerally in order to perform the comparing and to select a type and/or degree of activity filtering to be applied to the node 32 based on these ephemerally computed trust ratings. As yet another alternative, an embodiment might not fully compute the node trust rating 52 from all activities 32 as a discrete value; rather, the results of evaluating respective activities 32 might be computed to make incremental adjustments in the network entity trust rating 38 of the network entity 32. As a third variation of this third example, the device might comprise a plurality of interconnected and interoperating devices, such as a set of network servers comprising a network farm that presents a website to various users. Those of ordinary skill in the art may devise many variations in the scenarios and architectures wherein the techniques presented herein may be implemented.

A second aspect that may vary among embodiments of these techniques relates to the manner of evaluating activities 34 of a node 24 in order to assign a node trust rating 52 to the node 24. As a first example, an embodiment of these techniques may evaluate the content of the activities 34 of the node 24; e.g., an email server may evaluate the contents of email messages received from various nodes 24 based on keywords or patterns in the email message that are highly correlated with spam email messages, and a webserver may evaluate the contents of web requests to differentiate legitimate web requests that may be productively fulfilled from disingenuous web requests sent as part of a denial-of-service attack.

As a second example of this second aspect, an embodiment of these techniques may evaluate various activity properties of various activities 34 of the node 24. Such activity properties comprise various metrics, such as message metrics relating a volume of messages sent by the node 24 (e.g., where low rates of message sending may be indicative of non-spam email messages); recipient metrics, relating to the number of recipients of at least one message sent by the node 24 (e.g., where messages having a single recipient or only a few recipients may be indicative of non-spam email messages); and returned message metrics, relating to the number or rate of returned messages sent to the node 24 in response to a message sent by the node 24 (e.g., where low rates of bounced messages may be indicative of non-spam email messages.) Other metrics that may be relevant to the evaluation of the node 24 include connection metrics relating to the number of connections established by the node 24 (e.g., where low numbers of connections may be indicative of legitimate activities 34 initiated by a user 12) and bandwidth metrics relating to network bandwidth utilized by the node 24 (e.g., where low usage of upload bandwidth may be indicative of legitimate activities 34 initiated by a user 12.) These activity properties may be detected by the device 14, and/or may be detected by another device (e.g., a registry of legitimate users 12 and/or nodes 24) and transmitted to the device 14 for use in evaluating the activities 34 of the node 24. Other activity properties, such as other types of reports and metrics, may also be useful in evaluating the activities 34 of a node 24 to assign a node trust rating 52.

As a third example of this second aspect, the node trust rating 52 of a node 24 may be assigned based on various network properties exhibited by the node 24, which may be indicative of the type, configuration, and uses of the node 24 for distributing desirable or undesirable activities 34. Such network properties may be selected from a network property set comprising a name registry comprising a network name of the node 24 (e.g., some reputable name registries, such as domain registrars, may be less tolerant of nodes 24 distributing undesirable activities 34, and the registration of the node 24 with a reputable name registry may be more indicative of legitimate activities 34 of the node 24.) Such network properties might also include the network port status of at least one network port of the node 24, which may be indicative of the types of activities 34 engaged in by the user 12 of the node 24; a geographic location of the node 24 (e.g., where a node 24 hosted in a first geographic area may be more or less trustworthy than a node 24 hosted in a second geographic area), and/or at least one property of at least one network route associated with at least one network address 94 of the node 24 (e.g., the node 24 may be hosted within a virtual private network that is more or less trustworthy than nodes 24 outside of the virtual private network, and this factor may be identified according to the network route involved in reaching the node 24 over the network 22.) Such network routes may be determined, e.g., by evaluating the results of a routing path trace performed over the network 22.

As a fourth example of this second aspect, the node trust rating 52 of the node 24 may be assigned based on at least one user property of at least one user 12 of the node 24, where some users 12 or types of users 12 may be more or less trustworthy than other users 12 or types of users 12. The user properties may be selected from a user property set comprising a geographic location of the user 12 (e.g., where users located in a first geographic region may be more or less trustworthy, than users located in a second geographic region); a user type of the user 12 (e.g., a node 24 utilized by a government or a public corporation may be more trustworthy than a node 24 utilized by a private corporation or an individual); a reputation of the user 12 (e.g., some users 12 may have verifiable identities associated with trustworthy reputations that suggest a higher node trust rating 52 to be assigned to nodes 24 operated by the user 12, while other users 12 may have reputations of distributing undesirable activities 34, such as notorious spammers); and a financial status indicator of the user 12 (e.g., nodes 24 operated by a publicly traded corporation with high revenue streams may be more trustworthy than nodes 24 operated by bankrupt or struggling corporations or unknown corporations with indeterminate revenue streams.) Moreover, where the node trust rating 52 may be promoted based on a reputation of the user 12 of the node 24, the identity of the user 12 may be authenticated; e.g., upon receiving from the user 12 at least one user credential (such as a username and password combination, a certificate, a cryptographic signature generated an asymmetric private key held by the user 12, or a biometric measurement), the device 14 may authenticate the user using the user credentials, and may assign the node trust rating 52 to the node 24 based on the identity of the user 12 after authenticating the user 12.

As a fifth example of this second aspect, many types of evaluation may be applied to these various types of information about the activities 34 and the nodes 24 in order to assign a node trust rating 52 to a node 24. As a first variation of this fifth example, an embodiment of these techniques may evaluate the activities 34 of a node 24 by querying a user to evaluate one or more activities 34 (e.g., the user may be queried to examine the contents of an email message sent by the node 24 and to identify it as a spam email message or a non-spam mail message), and, upon receiving from the user a node trust rating 52 of the node 24, assigning the node trust rating 52 to the node 24. In other variations of this fifth example, various automated techniques may be utilized, such as the rule-based filtering techniques 28 illustrated in the exemplary scenario 10 of FIG. 1. In a second variation of this fifth example, a node activity classifier may be configured to evaluate the activities 34 of various nodes 24, and an embodiment of these techniques may use the node activity classifier to select a node activity classification of respective activities 34 of a node 24, and may assign the node trust rating 52 of the node 24 based on the selected node activity classifications. For example, a classifier technique, such as a Bayesian network, an artificial neural network, a set of heuristics, or an expert system, may be configured to evaluate various properties of an email message and to output a node activity classification identifying the email message as a spam email messages or a non-spam email message, and an embodiment of these techniques may use the node activity classifications of the classifier to evaluate the activities 34 of a node 24 and to assign a node trust rating 52 thereto.

Figure 7:
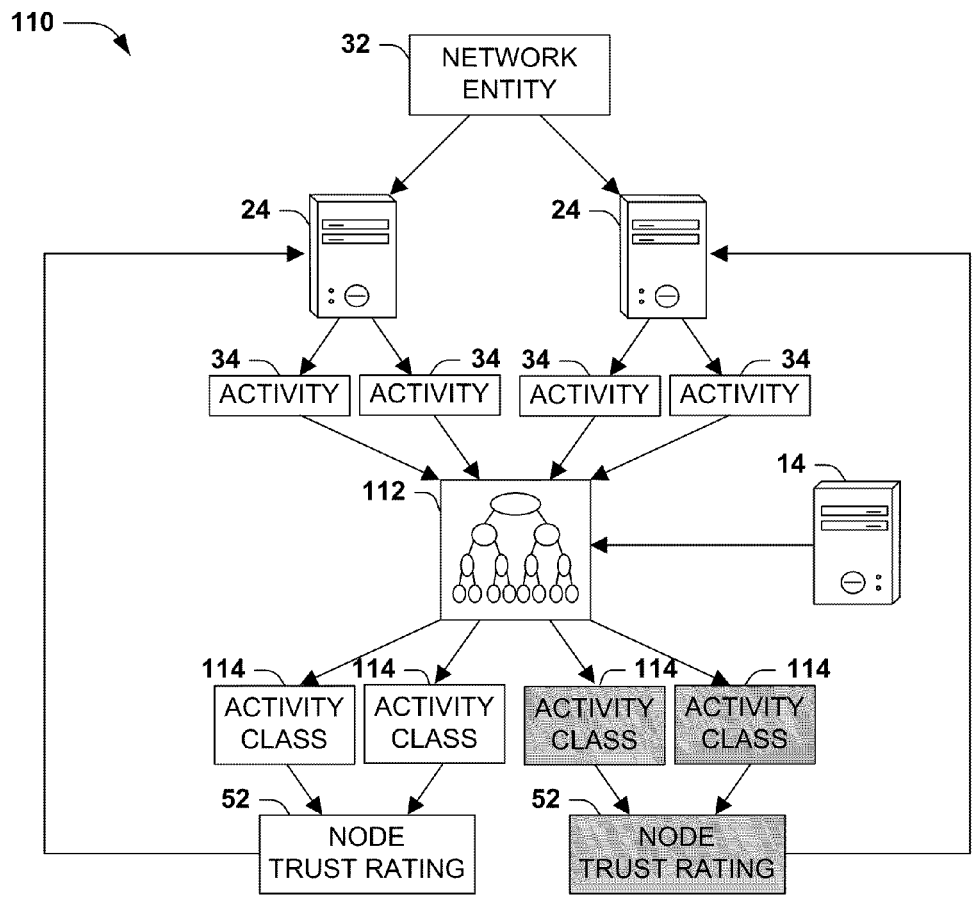
FIG. 7 is an illustration of an exemplary scenario featuring a classification of activities and a rating of nodes based on an automated classifier.

FIG. 7 presents an exemplary scenario 110 featuring the use of a classifier in the evaluation of activities 34 of nodes 24 controlled by a network entity 32 and the assignment of node trust ratings 52 to respective nodes 25 based upon the use of the classifier. In this exemplary scenario 110, a network entity 32 controls two nodes 24, each of which interacts with a device 14 featuring an embodiment of these techniques in order to transmit various activities 34 (e.g., email messages that may or may not be unsolicited bulk email messages.) The device 14 may have access to a node activity classifier 112, comprising a Bayesian network configured to evaluate respective activities 34 and to select a node activity classification 114 based thereupon (e.g., a classification of the email message as a spam email message or not a spam email message.) The device 14 may therefore apply the node activity classifier 112 to the activities 34 received from the nodes 24, and for respective activities 34 may select a node activity classification 114 generated by the node activity classifier 112. These node activity classifications 114 may be utilized to select a node trust rating 52 for the respective nodes 24; e.g., the Bayesian network identifies the activities 34 of the first node 24 as non-spam email messages, and a high node trust rating 52 is assigned to the first node 24, but the Bayesian network identifies the activities 34 of the second node 24 as spam email messages, and a poor node trust rating 52 is assigned to the second node 24.

As a sixth example of this second aspect, the evaluation of the activities 34 of a node 24 may be initiated in many ways. As a first variation of this sixth example, the activities 34 of any node 24 contacting the device 14 may be evaluated to determine the node trust rating 52 of the node 24. However, such broad-scale evaluation may impose a significant resource cost on the device 14, such as a delay in processing items received over the network 22 and a computational load on the processor 84. As a second variation of this sixth example, the device 14 may occasionally poll some activities 34 received from various nodes 24 (e.g., at random, or when computational resources, such as processor capacity, are plentiful), and may evaluate such polled activities 34 and assign node trust ratings 52 to the nodes 24 sending the activities 34. As a third variation of this sixth example, the device 14 may be configured to accept a request from a user 12 to evaluate activities 34 of a node 24, and may initiate the evaluation of the activities 34 and the assignment of the node trust rating 52 in response to the request. For example, a user 12 of a node 24 may be aware or notified that more stringent activity filtering 40 is being applied to the node 24 due to a poor network entity trust rating 38 of the network entity 32 controlling the node 24. The user 12 may endeavor to achieve less stringent activity filtering 52 of the node 24 by requesting the device 14 to evaluate the activities 34 of the node 24, in order to achieve an assignment to the node 34 of a high node trust rating 52 that "rescues" the node 24 from the more stringent activity filtering 40. The device 14 may receive the request from the user 12, may accordingly evaluate the activities 34 of the node 24, and may assign a node trust rating 52 to the node 24 based on the evaluated activities 34 in response to this request. Those of ordinary skill in the art may choose many types of information relevant in evaluating the activities 34 of various nodes 24, and many ways of evaluating such information to assign node trust ratings 52 to respective nodes, while implementing the techniques discussed herein.

A third aspect that may vary among embodiments of these techniques relates to the manner of determining a network entity 36 controlling a particular node 24. As a first example, the network entity 36 may be determined by evaluating a routing table identifying at least one network entity 36 and at least one network address 32 of at least one node 24 controlled by the network entity 36. This may be achieved, e.g., by evaluating a border gateway protocol (BGP) routing table stored by a routing device of the network 22, which may associate various nodes 24 with a controlling network entity 36 (e.g., by identifying a network address group allocated to an autonomous system (AS) identified by an autonomous system number (ASN), where the network address group contains the network address 32 of the node 24.) Because the network routes identified for communicating with a particular node 24 may be difficult to alter without disrupting network communication to the node 24, the information within these routing tables maybe comparatively up-to-date and reliable for determining a network entity 36 controlling a particular node 24. As a second example, the network entity 36 may be registered with a name registry (e.g., a domain name service or a WHOIS service) that is configured to associate node names with respective nodes 24 of the network 22. An embodiment of these techniques may be capable of determining the network entity 36 controlling a particular node 24 by identifying a node name of the node 24 according to the name registry, and by associating the node name of the node 24 with a network entity 36 according to the name registry. For example, a domain name service may be configured to associate nodes 24 controlled by a network entity 36 for a particular corporation with a domain name related to the name of the corporation (e.g., a particular store existing as a network entity 36 may register many controlled nodes 24 with the domain name service as having various node names comprising variations of "store.com".) Those of ordinary skill in the art may devise many ways of identifying a network entity 36 controlling a particular node 24 of the network 22 while implementing the techniques presented herein.

A fourth aspect that may vary among embodiments of these techniques relates to additional actions that may be performed in relation to the evaluation of activities 34, the assignment of node trust ratings 52 to nodes 24, and the filtering of activities 34 based on the node trust ratings 52. As a first example of this fourth aspect, an embodiment of these techniques maybe configured to exchange information about node trust ratings 52 assigned to nodes 24 with other devices, such as other trusted servers, in order to implement a distributed or broad consensus of node trust ratings 52. In a first such variation, upon identifying a node entity trust rating 52 of a node 24, an embodiment of these techniques may be configured to notify at least one trusted device of the node trust rating 52 assigned to the node 24. For example, a device 14 implementing these techniques may generate and circulate to other devices a network entity trust ratings list that indicates various node trust ratings 52 assigned by an embodiment of these techniques to various nodes 24. In a second such variation, an embodiment of these techniques may be configured to receive at least one node trust rating 52 from a trusted device, and to assign to a node 24 a node trust rating 52 based on both the evaluation of the activities 34 of the node 24 and the node trust rating 52 received from the trusted device. In this manner, a device 14 and an embodiment of these techniques implemented thereupon may exchange node trust ratings 52 assigned to various nodes 24 in order to pool determinations of trust ratings among trusted devices.

Figure 8:
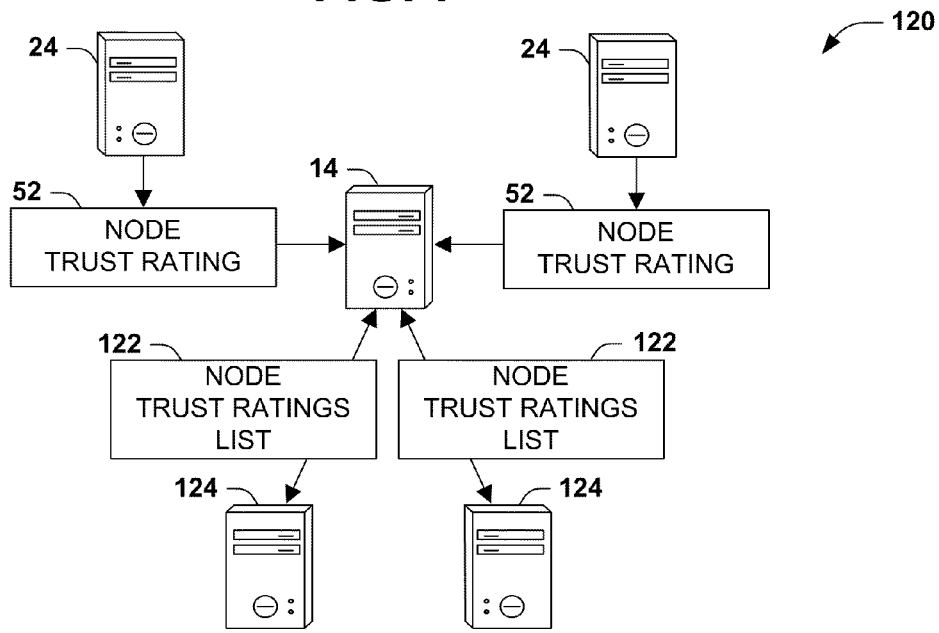
FIG. 8 is an illustration of an exemplary scenario featuring a sharing of assigned node trust ratings among trusted device.

FIG. 8 presents an exemplary scenario 120 featuring a sharing of node trust ratings 52 among trusted devices. A device 14 comprising an embodiment of these techniques may generate various node trust ratings 52 for respective nodes 24 according to the techniques presented herein. The device 14 may then generate a node trust ratings list 122, which may be shared with various trusted devices 124 (e.g., by sending the node trust ratings list 122 to the trusted devices 124, by receiving node trust ratings lists 122 from the trusted devices 124 and merging the node trust ratings 52 specified therein with those assigned by the device 14, and/or by synchronizing the node trust ratings 52 assigned by the device 14 with those assigned by the trusted devices 124 in order to generate a mutually acceptable node trust ratings list 122.) In these and other scenarios, the device 14 may coordinate with other trusted devices to share information relating to the node trust ratings 52 of various nodes 24.

As a first variation, if a user 12 of a particular node 24 may be identified and contacted, an embodiment of these techniques may be configured to notify the user 12 of events and information relating to the trust ratings of the node 24 and/or the network entity 46. For example, upon identifying a network entity trust rating 38 assigned to a network entity 32 based on at least one node trust rating 52 of a node 24 controlled by the network entity 24, the device 14 may identify a user 12 of one or more nodes 24 controlled by the network entity 32, and may notify the users 12 of the network entity trust rating 38 assigned to the network entity 32. This notification may be helpful for alerting the user 12 that the node(s) 24 operated by the user 12 are likely to be subjected to more stringent activity filtering 40. This event may not be desirable to the user 12, and the notification thereof might prompt the user 12 to take actions that alleviate the more stringent activity filtering 40, including working with an administrator of the network entity 32 to improve the network entity trust rating 38 of the network entity, switching to a new network entity 32 with a better network entity trust rating 38, or requesting evaluation of the activities 34 of one or more nodes 24 operated by the user 12 in order to achieve "rescue" of the node 24 from the more stringent activity filtering 40.

As a second example of this fifth aspect, following the assignment thereof to a node 24, an embodiment of these techniques may act to maintain the accurate assignment of node trust ratings 52 to nodes 24. This maintenance may be advantageous because the activities 24 of a node 24 may change over time (e.g., a node 24 that is misconfigured as an open relay that is exploited to retransmit spam email messages may be reconfigured by a user 12 to close the open relay, thereby improving the activities 34 of the node 24; conversely, a formerly trusted node 24 may be infected with malware that begins generating large volumes of undesirable activities 34.) Accordingly, after assigning a node trust rating 52 to a node 24, an embodiment of these techniques may be configured to, for nodes 24 interacting with the device 14 and controlled by the network entity 36, evaluate at least one subsequent activity 34 of the node 24 in order to assign an updated node trust rating 44 to the node 24. In this manner, the embodiment may maintain the freshness of the node trust ratings 52 assigned to various nodes 24 based on changes to the activities 34 thereof. Moreover, the evaluation of subsequent activities 34 may be performed in many ways. As a first variation, an embodiment may randomly poll activities 34 subsequently received from various nodes 24 in order to detect conformity with or deviance from the node trust rating 52 currently assigned to the node 24. As a second variation, an embodiment may detect changes in the behavior of a node 24 that may be indicative of present or imminent changes in the activities 34 received therefrom, such as an increase or decrease in bandwidth usage of a node 24 or in the rate of network connections established by a node 24. As a third variation, a node 24 that has been assigned a poor node trust rating 52 may be periodically given a chance to redeem its node trust rating 52. This variation may be helpful, e.g., where a node 24 assigned a particularly poor node trust rating 52 has been aggressively filtered, such as by blocking the receipt of many activities 34 from the node 24 or completely refusing network connections initiated by the node 24, because the node 24 may be unable to demonstrate improvements in the desirability of its activities 34. One such embodiment may reevaluate a node 24 by, for a particular evaluation period, reducing the filtering of the activities 34 of the node 24, and evaluating activities 34 received from the node 24 during the evaluation period to assign an updated node trust rating 52 to the node 24. In this manner, the embodiment may extend the "rescue" techniques even to nodes 24 that have previously performed significantly undesirable activities 34. Those of ordinary skill in the art may devise many ways of maintaining the freshness of the node trust ratings 52 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
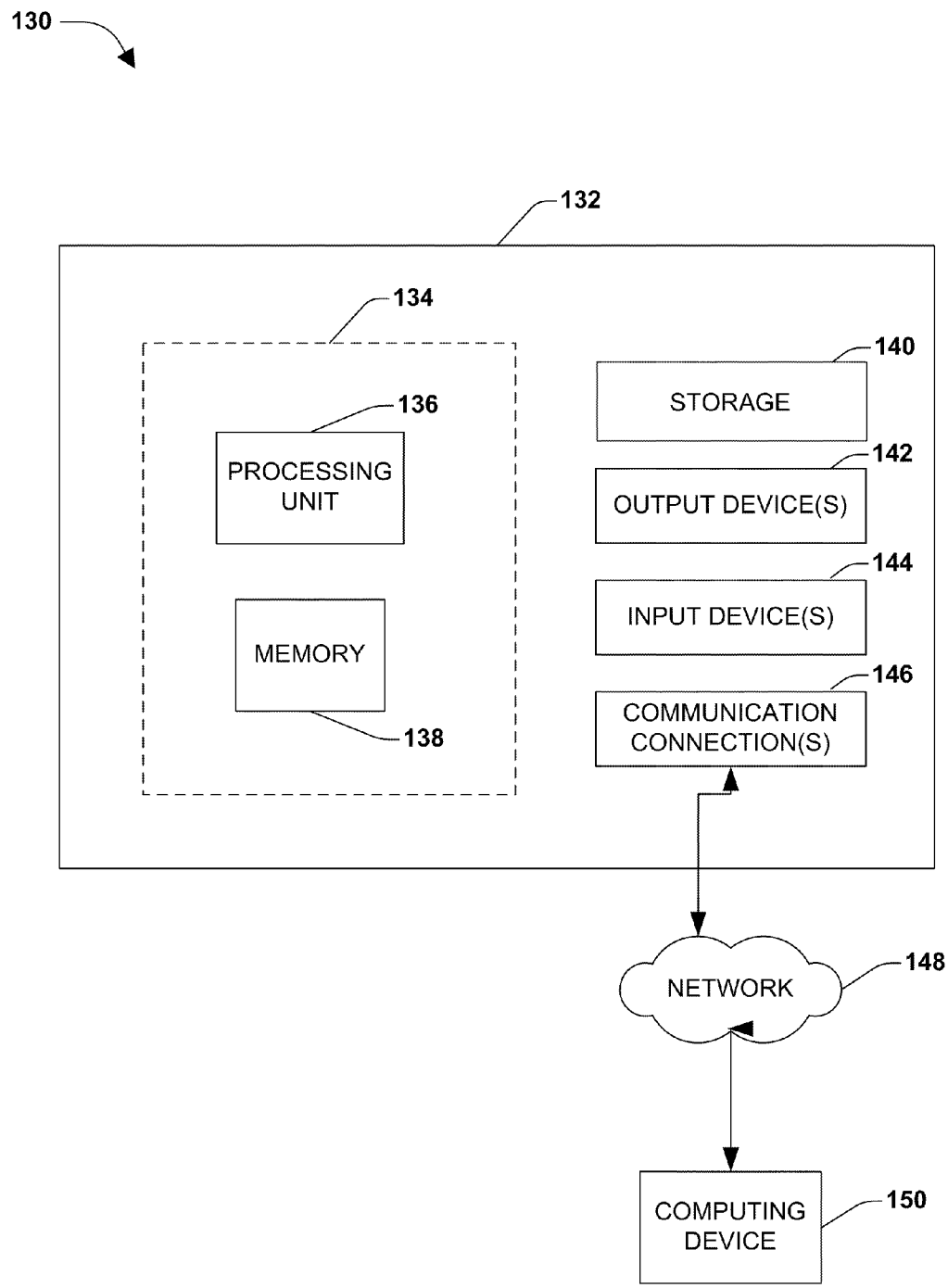
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 130 comprising a computing device 132 configured to implement one or more embodiments provided herein. In one configuration, computing device 132 includes at least one processing unit 136 and memory 138. Depending on the exact configuration and type of computing device, memory 138 may be volatile (such as RAM, for example), non-volatile (such as ROM, flash memory, etc., for example) or some combination of the two. This configuration is illustrated in FIG. 9 by dashed line 134.

In other embodiments, device 132 may include additional features and/or functionality. For example, device 132 may also include additional storage (e.g., removable and/or non-removable) including, but not limited to, magnetic storage, optical storage, and the like. Such additional storage is illustrated in FIG. 9 by storage 140. In one embodiment, computer readable instructions to implement one or more embodiments provided herein may be in storage 140. Storage 140 may also store other computer readable instructions to implement an operating system, an application program, and the like. Computer readable instructions may be loaded in memory 138 for execution by processing unit 136, for example.

The term "computer readable media" as used herein includes computer storage media. Computer storage media includes volatile and nonvolatile, removable and non-removable media implemented in any method or technology for storage of information such as computer readable instructions or other data. Memory 138 and storage 140 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 132. Any such computer storage media may be part of device 132.

Device 132 may also include communication connection(s) 146 that allows device 132 to communicate with other devices. Communication connection(s) 146 may include, but is not limited to, a modem, a Network Interface Card (NIC), an integrated network interface, a radio frequency transmitter/receiver, an infrared port, a USB connection, or other interfaces for connecting computing device 132 to other computing devices. Communication connection(s) 146 may include a wired connection or a wireless connection. Communication connection(s) 146 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 132 may include input device(s) 144 such as keyboard, mouse, pen, voice input device, touch input device, infrared cameras, video input devices, and/or any other input device. Output device(s) 142 such as one or more displays, speakers, printers, and/or any other output device may also be included in device 132. Input device(s) 144 and output device(s) 142 may be connected to device 132 via a wired connection, wireless connection, or any combination thereof. In one embodiment, an input device or an output device from another computing device may be used as input device(s) 144 or output device(s) 142 for computing device 132.

Components of computing device 132 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 132 may be interconnected by a network. For example, memory 138 may be comprised of multiple physical memory units located in different physical locations interconnected by a network.

Those skilled in the art will realize that storage devices utilized to store computer readable instructions may be distributed across a network. For example, a computing device 150 accessible via network 148 may store computer readable instructions to implement one or more embodiments provided herein. Computing device 132 may access computing device 150 and download a part or all of the computer readable instructions for execution. Alternatively, computing device 132 may download pieces of the computer readable instructions, as needed, or some instructions may be executed at computing device 132 and some at computing device 150.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of filtering activities of a node interacting over a network with a device having a processor, the method comprising:
executing on the processor instructions configured to:
evaluate at least one activity of the node interacting with the device to assign a node trust rating to the node;
compare the node trust rating with a network entity trust rating of a network entity controlling the node;
upon identifying a node trust rating of the node higher than the network entity trust rating of the network entity, filter activities of the node based on the node trust rating; and
upon not identifying a node trust rating of the node higher than the network entity trust rating of the network entity, filter activities of the node based on the network entity trust rating.

2. The method of claim 1, wherein at least one activity of the node interacting with the device selected from an activity set comprises:
sending at least one email message to the device;
sending at least one text message to the device;
sending at least one social network message to the device;
sending at least one weblog post to the device; and
utilizing at least one service of the device.

3. The method of claim 1, wherein evaluating the at least one activity of the node comprising: evaluating at least one activity property of at least one activity of the node, the at least one activity property selected from an activity properties set comprises:
a message metric of messages sent by the node;
a recipient metric of recipients of at least one message sent by the node;
a returned message metric of returned messages sent to the node in response to at least one message sent by the node;
a connection metric of connections established by the node; and
a bandwidth metric of bandwidth utilized by the network.

4. The method of claim 3, wherein:
the network entity controlling at least one trusted node that is assigned a higher node trust rating than the network entity trust rating; and
evaluating the at least one activity of the node comprising:
identifying at least one activity of the node that corresponds to at least one activity of the at least one trusted node associated with the node trust rating of the trusted node.

5. The method of claim 3, wherein:
the network entity controlling at least one untrusted node that is not assigned a higher node trust rating than the network entity trust rating; and
evaluating the at least one activity of the node comprising:
identifying at least one activity of the node that differs from at least one activity of the at least one untrusted node associated with the node trust rating of the at least one untrusted node.

6. The method of claim 1, wherein assigning the node trust rating of the node comprises: assigning the node trust rating of the node based on at least one network property exhibited by the node, the at least one network property selected from a network property set comprising:
a name registry comprising a node name of the node;
at least one network port status of at least one network port of the node;
a geographic location of the node; and
at least one property of at least one network route associated with at least one network address of the node.

7. The method of claim 1, wherein assigning the node trust rating of the node comprises: assigning the node trust rating of the node based on at least one user property of at least one user of the node, the at least one user property selected from a user property set comprising:
a geographic location of the user;
a user type of the user;
a reputation of the user; and
a financial status indicator of the user.

8. The method of claim 7, wherein assigning the node trust rating of the node based on the at least one user property of a user of the node comprises: upon receiving from the user at least one user credential:
authenticating the user using the at least one user credential; and
upon authenticating the user, assigning the node trust rating of the node based on the at least one user property of the user.

9. The method of claim 1, wherein assigning the node trust rating of the node comprises:
querying a user to evaluate at least one activity of the node, and
upon receiving from the user a node trust rating of the node, assigning the node trust rating to the node.

10. The method of claim 1, wherein assigning the node trust rating of the node comprises:
selecting a node activity classification of the activity of the node using a node activity classifier configured to evaluate activities of nodes, and
assigning the node trust rating of the node based on the node activity classification.

11. The method of claim 1, wherein evaluating the at least one activity of the node interacting with the device comprises:
upon receiving a request from a user of the node to evaluate at least one activity of the node, evaluating the at least one activity of the node interacting with the device to assign a node trust rating to the node.

12. The method of claim 1, wherein:
the network entity identified in a routing table as controlling a network address block, and
the node having a network address within the network address block.

13. The method of claim 1, wherein:
at least one network entity registered with a name registry associating a node name with respective nodes of the network, and
determining the network entity comprising:
identifying a node name of the node, and
associating the node name of the node with a network entity according to the name registry.

14. The method of claim 1, further comprising: notifying at least one trusted device of at least one node trust rating assigned to the node.

15. The method of claim 1, wherein assigning the node trust rating of the node comprises:
receiving at least one node trust rating of the node from at least one trusted device, and
assigning the node trust rating of the node based on the at least one activity of the node interacting with the device and the node trust rating received from the at least one trusted device.

16. The method of claim 1, further comprising: upon identifying a network entity trust rating assigned to a network entity based on at least one node trust rating of a node controlled by the network entity:
identifying at least one user of at least one node controlled by the network entity; and
notifying the at least one user of the network entity trust rating assigned to the network entity.

17. The method of claim 1, further comprising: after assigning a node trust rating to a node:
evaluating at least one subsequent activity of the node to determine an updated node trust rating of the node; and
upon determining an updated node trust rating of the node based on the at least one subsequent activity of the node, assigning to the node the updated node trust rating.

18. The method of claim 17, wherein evaluating the at least one subsequent activity of the node comprises:
for an evaluation period, reducing filtering of the activities of the node; and
evaluating the at least one activity of the node received during the evaluation period to assign an updated node trust rating of the node.

19. A computer-readable memory device comprising instructions that, when executed on a processor of a device, filter activities of a node interacting with the device over a network by:
evaluating at least one activity of the node that is interacting with the device to assign a node trust rating to the node;
comparing the node trust rating of the node with a network entity trust rating of a network entity controlling the node; and
filtering activities of the node by:
upon the trust rating comparing component identifying a higher node trust rating of the node than the network entity trust rating of the network entity, filtering activities of the node based on the node trust rating; and
upon the trust rating comparing component failing to identify a higher node trust rating of the node than the network entity trust rating of the network entity, filtering activities of the node based on the network entity trust rating.

20. A computer-readable memory device storing instructions that, when executed by a device, filter activities of a node interacting over a network with the device by:
evaluating at least one activity of the node interacting with the device to assign a node trust rating to the node by:
selecting a node activity classification of the activity of the node using a node activity classifier configured to evaluate activities of nodes, and
assigning the node trust rating of the node based on the node activity classification,
the node trust rating based on at least one network property exhibited by the node the at least one network property selected from a network property set comprising:
a name registry comprising a node name of the node;
at least one network port status of at least one network port of the node;
a geographic location of the node;
the node trust rating based on at least one user property of at least one user of the node, the at least one user property selected from a user property set comprising:
a geographic location of the user;
a user type of the user;
a reputation of the user; and
a financial status indicator of the user; and
the node trust rating based on at least one property of at least one network route associated with at least one network address of the node, the at least one activity selected from an activity set comprising:
sending at least one email message to the device;
sending at least one text message to the device;
sending at least one social network message to the device;
sending at least one weblog post to the device; and
utilizing at least one service of the device;
notifying at least one trusted device of at least one node trust rating of the node assigning a network entity trust rating to a network entity based on at least one node trust rating of a node controlled by the network entity;
identifying at least one user of at least one node controlled by the network entity;
notifying the at least one user of the network entity trust rating assigned to the network entity;
comparing the node trust rating with a network entity trust rating of a network entity controlling the node;
upon identifying a node trust rating of the node higher than the network entity trust rating of the network entity, filtering activities of the node based on the node trust rating;
upon not identifying a node trust rating of the node higher than the network entity trust rating of the network entity, filtering activities of the node based on the network entity trust rating; and
after assigning a node trust rating to a node:
evaluating at least one subsequent activity of the node to assign an updated node trust rating of the node; and
upon determining an updated node trust rating of the node based on the at least one subsequent activity of the node, assigning to the node the updated node trust rating.

* * * * *